US011379533B2

(12) United States Patent
Tahiri et al.

(10) Patent No.: US 11,379,533 B2
(45) Date of Patent: Jul. 5, 2022

(54) ASSESSING QUALITY OF AN ACTIVE DIRECTORY

(71) Applicant: Microsoft Technology Licensing, LLC, Redmond, WA (US)

(72) Inventors: Navid Ahmed Tahiri, Redmond, WA (US); Tannaz Sattari Tabrizi, Bellevue, WA (US); Andrei Catalin Zlati, Kirkland, WA (US); Dheepak Ramaswamy, Seattle, WA (US); Umashree Narayanaswamy, Redmond, WA (US); Pramod Dhandapani, Hyderabad (IN); Marilyn Nicole Harris, New York, NY (US); Vindana Madhuwantha, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 254 days.

(21) Appl. No.: 16/746,039

(22) Filed: Jan. 17, 2020

(65) Prior Publication Data

US 2021/0224327 A1    Jul. 22, 2021

(51) Int. Cl.
| G06F 16/00 | (2019.01) |
| G06F 16/9035 | (2019.01) |
| G06F 16/901 | (2019.01) |
| G06F 16/9536 | (2019.01) |
| G06F 16/335 | (2019.01) |

(52) U.S. Cl.
CPC ........ *G06F 16/9035* (2019.01); *G06F 16/337* (2019.01); *G06F 16/9027* (2019.01); *G06F 16/9536* (2019.01)

(58) Field of Classification Search
CPC .................................................... G06F 16/337
See application file for complete search history.

(56) References Cited

U.S. PATENT DOCUMENTS

| 7,324,999 B2 | 1/2008 | Judd |
| 7,603,438 B2 | 10/2009 | Daos et al. |
| 8,793,355 B2 | 7/2014 | Moser et al. |
| 9,563,782 B1 | 2/2017 | Brisebois et al. |
| 2005/0015383 A1 | 1/2005 | Harjanto |
| 2005/0138420 A1 | 6/2005 | Sampathkumar et al. |

(Continued)

OTHER PUBLICATIONS

"Deleting Active Directory objects that have many links causes replication failures", Retrieved From: https://support.microsoft.com/en-ca/help/3149779/deleting-active-directory-objects-that-have-many-links-causes-replicat, Retrieved Date: Nov. 18, 2019, 5 Pages.

(Continued)

*Primary Examiner* — Ajith Jacob
(74) *Attorney, Agent, or Firm* — Schwegman Lundberg & Woessner, P.A.

(57) ABSTRACT

A system and method for validating user profile data from a directory application is described. The system accesses user collaboration data of a plurality of users of an application. The system also accesses a directory application that manages user profile data for each user of the plurality of users. A set of heuristics is applied on the user profile data. The system validates results of the applied set of heuristics on the user profile data with the user collaboration data. The quality of the user profile data is assessed based on the validation.

18 Claims, 12 Drawing Sheets

(56) References Cited

U.S. PATENT DOCUMENTS

2014/0053110 A1    2/2014  Brown et al.
2016/0034588 A1*  2/2016  Hyatt .................... G06F 16/288
                                                                     707/733

OTHER PUBLICATIONS

"Oracle Global Human Resources Cloud R13 (Updates 18A-18C)", Retrieved From: https://www.oracle.com/webfolder/technetwork/tutorials/tutorial/cloud/r13/wn/r13-2018-global-hr-wn.htm, Retrieved Date: Jan. 22, 2020, 63 Pages.
"Hierarchy", Retrieved From: https://en.wikipedia.org/w/index.php?t%20itle=Hierarchy&oldid=931344116, Dec. 18, 2019, 16 Pages.
"International Search Report and Written Opinion issued in PCT Application No. PCT/US20/064972", dated Apr. 12, 2021, 10 Pages.

* cited by examiner

ASSESSING QUALITY OF AN ACTIVE DIRECTORY

TECHNICAL FIELD

The subject matter disclosed herein generally relates to a special-purpose machine that validates user profile data of a directory application, including computerized variants of such special-purpose machines and improvements to such variants. Specifically, the present disclosure addresses systems and methods for assessing a quality of an enterprise active directory.

BACKGROUND

Enterprise applications (e.g., document editing application) provide a platform for users to collaborate and interact with one another. However, user interactions within an enterprise setting may be difficult to be evaluated given the noise of the interaction data between users of the enterprise. Furthermore, user profile data of a directory application may outdated because the users often time do not update their profile data in the active directory. An administrator of the enterprise application typically updates the profile data of a user when the user joins or leaves the enterprise.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
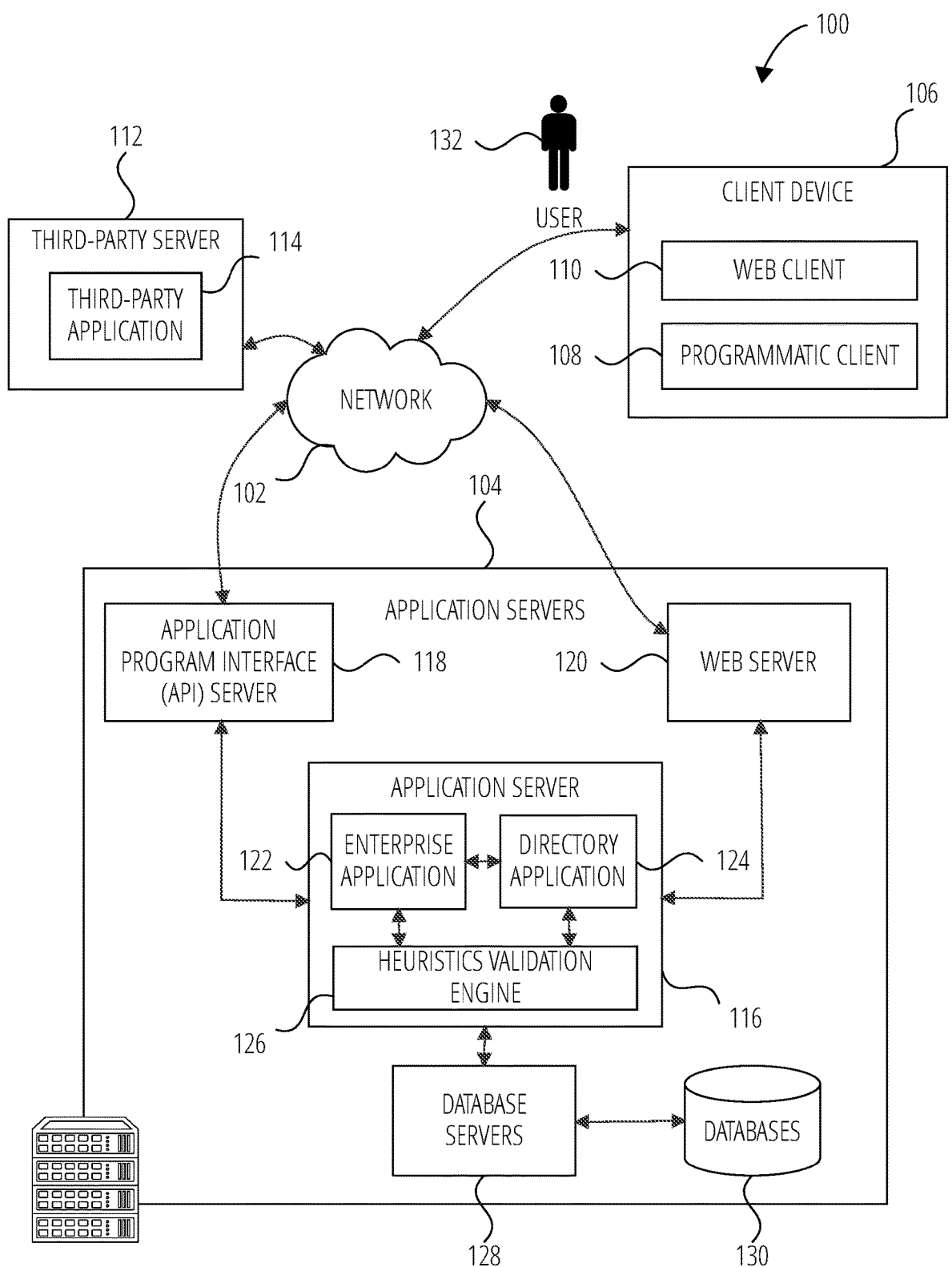
FIG. 1 is a diagrammatic representation of a networked environment in which the present disclosure may be deployed, in accordance with some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Directories of enterprise users' profile are often prone to be outdated because they rely on proactive input and regular updates from users and administrators. There is little incentive for users to update profile attributes such as skills attribute or manager attribute in an enterprise directory of an enterprise. An enterprise represents organizations or groups of users associated with an organization. An example of a directory application includes an active directory application that manages the user profile data. The present application describes a system that applies heuristics (e.g., a set of rules or computations) on the user profile data. The system evaluates the results of the heuristics with collaboration data to assess a quality of hierarchy data of an active directory of the enterprise. The collaboration data includes, for example, people organizational network relations, collaborations topics, collaboration patterns, network metrics, skills, and projects. In one example, if the quality of the active directory below a threshold, the system recommends a collaboration analysis module to use an alternative source of active directory or to perform an analysis on the collaboration data using parameters that do not rely on the profile attributes of the active directory. In another example, the system uses the collaboration data to correct and/or validate manager attributes of the user profile data of the users in the active directory.

In one example embodiment, a system and method for validating user profile data from a directory application is described. The system accesses user collaboration data from a plurality of users of an application. The system also accesses a directory application that manages user profile data for each user of the plurality of users. A set of heuristics is applied on the user profile data. The system validates the results of the applied set of heuristics on the user profile data with the user collaboration data. The quality of the user profile data is assessed based on the validation.

As a result, one or more of the methodologies described herein facilitate solving the technical problem of manually correcting and updating profile attributes of an active directory. Data in a directory is often manually inputted by an administrator or the user. However, manual update of data is often prone to error and inaccuracies. Furthermore, any analysis performed based on data from the active directory may be inaccurate. As such, one or more of the methodologies described herein may obviate a need for certain efforts or computing resources (e.g., manually identifying incorrect attributes, correcting the incorrect attributes, validating profile attributes, updating the profile attributes of users of an enterprise). Examples of such computing resources include processor cycles, network traffic, memory usage, data storage capacity, power consumption, network bandwidth, and cooling capacity.

FIG. 1 is a diagrammatic representation of a network environment 100 in which some example embodiments of the present disclosure may be implemented or deployed. One or more application servers 104 provide server-side functionality via a network 102 to a networked user device, in the form of a client device 106. A user 132 from an enterprise operates the client device 106. The client device 106 includes a web client 110 (e.g., a browser), a programmatic client 108 (e.g., an email/calendar application such as Microsoft Outlook™, an instant message application, a document writing application, a shared document storage application) that is hosted and executed on the client device 106. In one example embodiment, the programmatic client 108 accesses interaction data from a combination of the enterprise application 122, the programmatic client 108, or the web client 110. The interaction data identifies items that are communicated from other users of the enterprise to the user 132 and from the user 132 to other users of the enterprise. Examples of interaction data includes and are not limited to email communications, meeting communications, instant messages, shared document comments, and any communication with a recipient (e.g., a user from the enterprise).

An Application Program Interface (API) server 118 and a web server 120 provide respective programmatic and web interfaces to application servers 104. A specific application server 116 hosts an enterprise application 122 and a heuristics validation engine 126. Both enterprise application 122 and heuristics validation engine 126 include components, modules and/or applications.

The enterprise application 122 may include collaborative applications (e.g., a server side email/calendar enterprise application, a server side instant message enterprise application, a document writing enterprise application, a shared document storage enterprise application) that enable users of an enterprise to collaborate and share document, messages, and other data (e.g., meeting information, common projects) with each other. Collaboration data identifies items communicated with the collaboration applications. Examples of collaboration data includes and are not limited to meeting information (e.g., frequency and duration of one-on-one meeting between user x and user y) and document sharing information (e.g., frequency and duration of user x and user y sharing and editing a common document). The user 132 at the client device 106 may access the enterprise application 122 to edit documents that are shared with other users of the same enterprise. In another example, the client device 106 accesses the enterprise application 122 to retrieve or send messages or emails to and from other peer users of the enterprise. Other examples of enterprise application 122 includes enterprise systems, content management systems, and knowledge management systems.

The directory application 124 includes, for example, an active directory. An active directory is used to manage computers and other devices on a network. The active directory may operate on an operating system that runs both local and Internet-based servers. The active directory allows network administrators to create and manage domains, users, and objects within a network. For example, an administrator can create a group of users and give them specific access privileges to certain directories on the server. As a network grows, the active directory provides a way to organize a large number of users into logical groups and subgroups, while providing access control at each level.

In one example embodiment, the heuristics validation engine 126 communicates with both the enterprise application 122 and the directory application 124. The heuristics validation engine 126 accesses interaction data from users in the enterprise from the enterprise application 122. The heuristics validation engine 126 accesses user profile data from the directory application 124. In another example embodiment, the heuristics validation engine 126 communicates with the programmatic client 108 to receive instructions to perform an analysis based on the user profile data from the directory application 124 and collaboration data from the enterprise application 122. In one example, the programmatic client 108 communicates with the application server 116 via the web server 120. In another example, the web client 110 communicate with the heuristics validation engine 126 and enterprise application 122 via the programmatic interface provided by the Application Program Interface (API) server 118.

The heuristics validation engine 126 applies a set of rules by performing a computation on the user profile data. In one example, the heuristics validation engine 126 assesses the quality of the user profile data based on the results of the computation. In another example, the heuristics validation engine 126 assesses a quality of a managerial hierarchy of users of the enterprise from the active directory based on results of heuristics applied to the user profile data.

In another example embodiment, the heuristics validation engine 126 determines that the quality of the user profile data in the active directory is below a threshold. In response, the heuristics validation engine 126 performs a clean-up operation of the user profile data (e.g., manager attribute) of the active directory based on the collaboration data. For example, the heuristics validation engine 126 determines a missing manager attribute for a user based on the collaboration data and updates the user profile data for the user. In another example, the heuristics validation engine 126 validates an existing manager attribute for a user based on the collaboration data. In another example, the heuristics validation engine 126 updates the existing manager attribute for a user based on the collaboration data.

In another example embodiment, the heuristics validation engine 126 determines that the quality of the user profile data in the active directory is below a threshold (after applying the set of rules from the set of heuristics). In response, the heuristics validation engine 126 generates a recommendation to the enterprise application 122 to avoid performing a collaboration analysis (performed by an analysis module—not shown—at the enterprise application 122 or by the heuristics validation engine 126) of the users of the enterprise application 122 using metrics that depend on an unreliable attribute (e.g., manager attribute) in the user profile data. In another example, the heuristics validation engine 126 generates a recommendation to the collaboration analysis to use another source of directory given the low reliability of the active directory. In another example, the heuristics validation engine 126 generates a recommendation to generate an alternative user experience that does not display any metrics that depend on the unreliable attribute (e.g., manager attribute) of the user profile data from the active directory.

The application server 116 is shown to be communicatively coupled to database servers 128 that facilitates access to an information storage repository or databases 130. In an example embodiment, the databases 130 includes storage devices that store information to be processed by the enterprise application 122 and the heuristics validation engine 126.

Additionally, a third-party application 114 may, for example, store another part of the enterprise application 122, or include a cloud storage system. The third-party application 114 executing on a third-party server 112, is shown as having programmatic access to the application server 116 via the programmatic interface provided by the Application Program Interface (API) server 118. For example, the third-party application 114, using information retrieved from the application server 116, may supports one or more features or functions on a website hosted by the third party.

Figure 2:
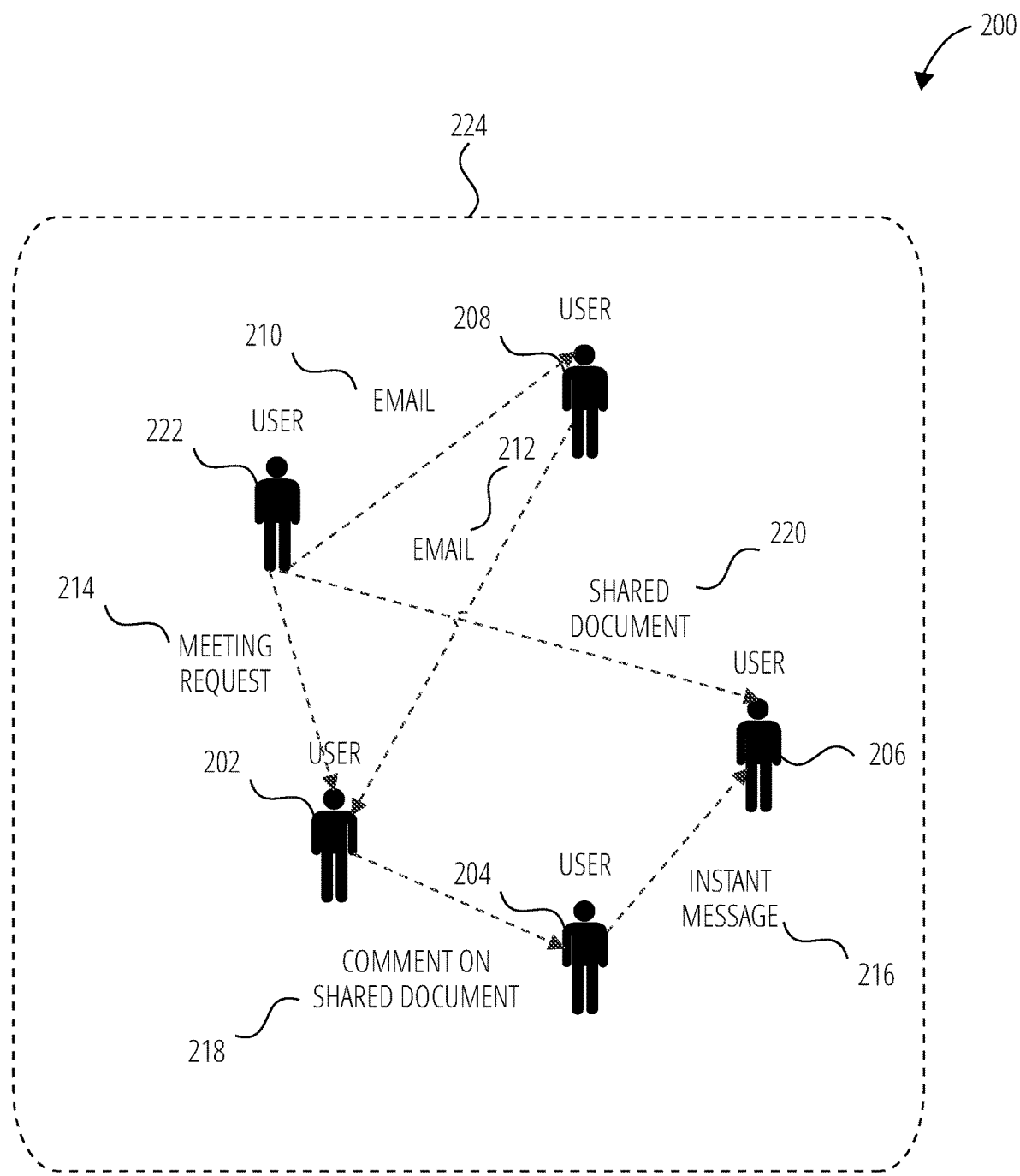
FIG. 2 is a diagrammatic representation of interactions between users of an application in an enterprise, in accordance with some example embodiments.

FIG. 2 is a diagram representation of interactions 200 between users in an enterprise 224, in accordance with some example embodiments. The diagram illustrates peer users (e.g., user 202, user 206, user 208, user 222) that are part of the enterprise 224 and are users of the enterprise application 122. The peer users use a respective client device (not shown) using one or more client applications (not shown) to communicate and collaborate with one another (e.g., via the enterprise application 122).

For example, the user 222 sends an email 210 to user 208, sends a shared document 220 to user 206, and sends a meeting request 214 to user 202. The user 208 receives the email 210 from user 222, sends an email 212 to user 202. The user 202 receives the meeting request 214 from user 222, receives the email 212 from user 208, and shares a comment on shared document 218 with user 204. The user 204 receives the comment on shared document 218 from 202 and sends an instant message 216 to user 206.

In one example embodiment, the heuristics validation engine 126 and/or enterprise application 122 collect user collaboration data representing the interactions between peer users of the enterprise 224 described above. In another example embodiment, the heuristics validation engine 126/enterprise application 122 collect interaction data from a corresponding user of a client device. The heuristics validation engine 126/enterprise application 122 may collect the interaction data for a preset period of time at a preset frequency (e.g., a one-week interval, year to date, or other time frame).

In another example embodiment, the heuristics validation engine 126/enterprise application 122 collects user interaction data for a user up to a preset degree of contacts. For example, if the preset degree is one, the interaction data for the user 222 includes interaction data for user 208, user 202, and user 206. A core working group of the user 222 would thus include user 208, user 202, and user 206.

Figure 3:
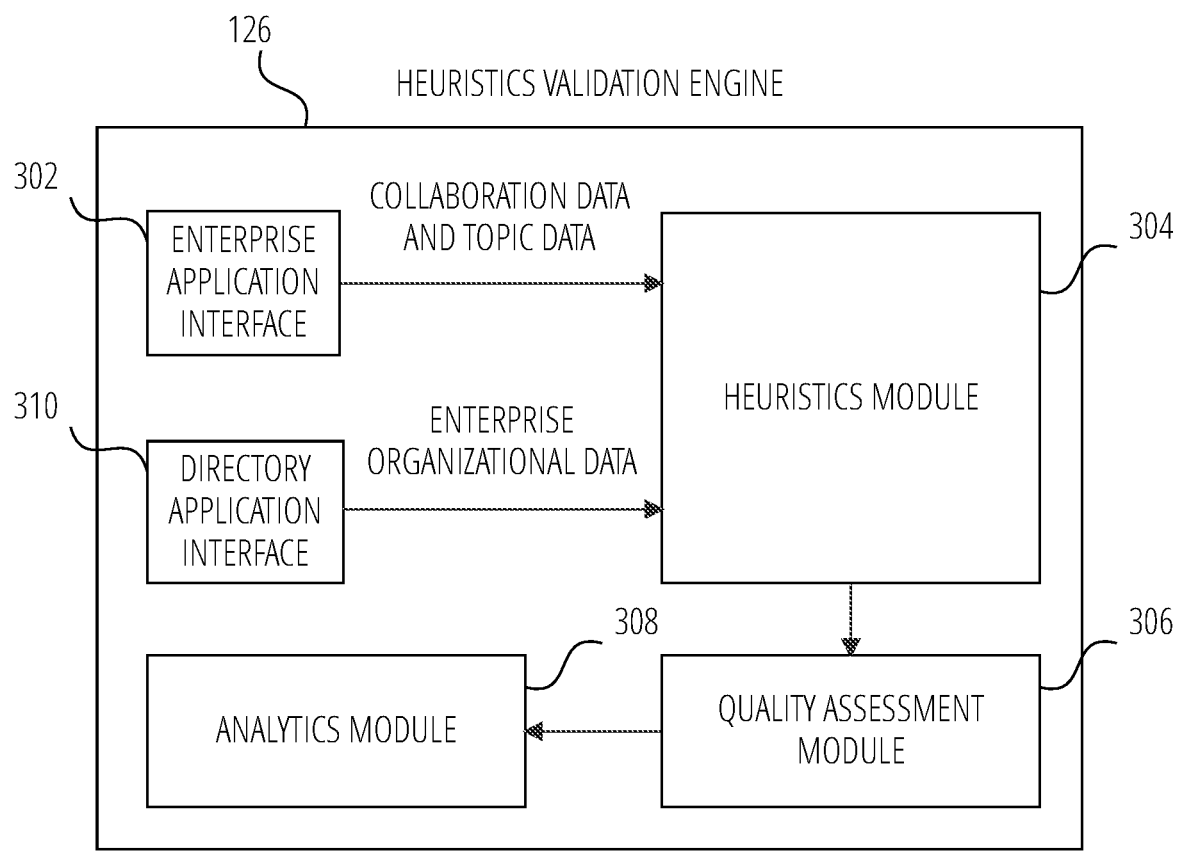
FIG. 3 is a block diagram illustrating a heuristics validation engine in accordance with one example embodiment.

FIG. 3 is a block diagram illustrating a heuristics validation engine 126 in accordance with one example embodiment. The heuristics validation engine 126 comprises an enterprise application interface 302, a heuristics module 304, a quality assessment module 306, an analytics module 308, and a directory application interface 310.

The enterprise application interface 302 communicates with the client devices of the users in the enterprise 224 and/or with the enterprise application 122. In one example embodiment, the enterprise application interface 302 retrieves collaboration data (e.g., frequency and duration of one-on-one meetings between user x and user y, frequency and time of communication between user x and user y on topic z) and topic data (e.g., topic z, subject header in a message, keyword in a meeting request) from the enterprise application 122/heuristics validation engine 126 or the client device 106. In another example embodiment, the enterprise application interface 302 accesses collaboration data from the web client 110 or the programmatic client 108. In another example embodiment, the enterprise application interface 302 retrieves user interaction data from the enterprise application 122, heuristics validation engine 126, client device 106, web client 110, or programmatic client 108.

The directory application interface 310 retrieves enterprise organizational data from the directory application 124. An example of enterprise organizational data includes user profile data. The user profile data includes the profile data for one or more users of the enterprise 224. In one example, the user profile data include a manager attribute that indicate a manager hierarchy. Other examples of attributes include, but are not limited to, a leader attribute, a team attribute, a group attribute, a project attribute, a supervisor attribute. In another example embodiment, the heuristics module 304 generates a tree based on the enterprise organizational data where the parent nodes represent the managers and the leaf nodes represent users that report to the managers.

The heuristics module 304 computes a set of heuristics to measure a quality of the enterprise organizational data based on the collaboration data. For example, the heuristics module 304 identifies a list of users and their corresponding managers from the user profile data. The heuristics module 304 generates a team hierarchy based on the list of users and managers. The heuristics module 304 applies a set of rules (e.g., clean-up operations) to the team hierarchy. For example, the heuristics module 304 performs a function that identifies and removes isolated users (e.g., a user with no child node and no parent node). In another example, the heuristics module 304 performs a function that identifies and removes users caught in loops (e.g., a user with reporting to a manager who is one or more level below the user). The heuristics module 304 modifies the manager attribute of a user profile data based on the results of the heuristics.

In another example embodiment, the heuristics module 304 uses the collaboration data from the directory application interface 310 to validate the manager attribute of the user profile data. In one example, the heuristics module 304 validates the modified manager attribute of the user profile data after applying the set of heuristics to the user profile data. For example, the heuristics module 304 identifies a manager of a user based on a collaboration data between the manager and the user (e.g., how often and when the user and the manager communicate with each other). An example embodiment of the heuristics module 304 is described below further with respect to FIG. 4.

The quality assessment module 306 determines a quality of the user profile data based on the results of the heuristics and the collaboration data from the heuristics module 304. For example, the quality assessment module 306 determines that 80% of the values in the manager attribute of the user profile data are valid (based on the results of the heuristics and comparing with the collaboration data). In another example, the quality assessment module 306 classifies the user data profile into one of five categories: Excellent, Very Good, Good, Acceptable, and Poor. These categories may be based on preset percentage validity ranges (e.g., 90% to 100% is excellent). In another example, the quality assessment module 306 generates a quality score based on the percentage validity (e.g., score of 10 when at least 95% of the values of the manager attributes of the profile data are valid).

In another example embodiment, the quality assessment module 306 compares the quality score of the user profile data with a preset threshold (for the user, the group, or the enterprise) and generates a recommendation based on the comparison. For example, if the quality score of the user profile data is below a preset threshold (e.g., score of 6), the quality assessment module 306 provides one or more recommendations to the analytics module 308.

The analytics module 308 performs a statistical computation on the collaboration data and/or interaction data. The analytics module 308 may also generate a graphical user interface that relies on the values in the manager attributes of the user profile data in the directory application 124. For example, the analytics module 308 may render a graphical tree that illustrates the enterprise organization hierarchy. The analytics module 308 receives a recommendation from the quality assessment module 306. The recommendation may be for the analytics module 308 to use an alternative directory source instead of the directory application 124. The recommendation may be for the analytics module 308 to provide an alternative user interface that is not dependent on the active directory data (e.g., manager attribute of the user profile data). The recommendation may be for the analytics module 308 to modify a user experience workflow that does not depend on the manager attribute of the user profile data). In another example, the recommendation may prevent the analytics module 308 from computing a metric that is dependent on the manager attribute.

Figure 4:
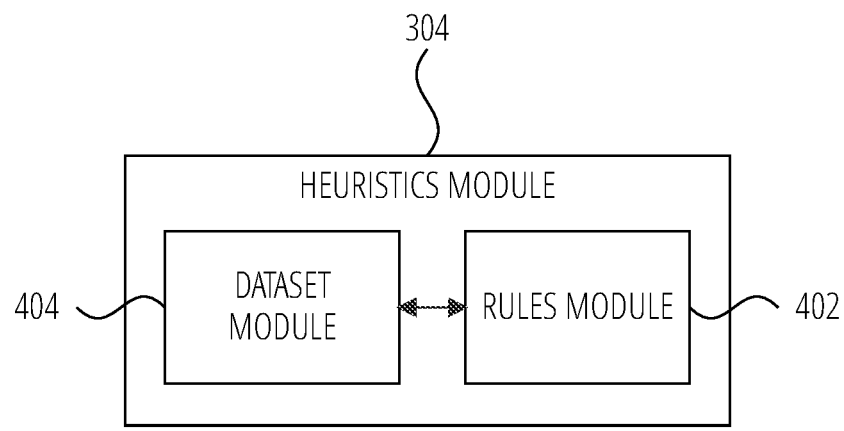
FIG. 4 is a block diagram illustrating a heuristics module in accordance with one example embodiment.

FIG. 4 is a block diagram illustrating a heuristics module 304 in accordance with one example embodiment. The heuristics module 304 includes a rules module 402, and a dataset module 404.

The dataset module 404 accesses the enterprise application interface 302 to retrieve the collaboration data and topic data, and the directory application interface 310 to retrieve the enterprise organization data (e.g., user profile data).

The rules module 402 applies a set of rules on the user profile data. The rules module 402 accesses the user profile data and identifies the users and managers based on the user profile data. The rules module 402 generates a tree hierarchy based on the identified users and managers. The rules module 402 includes for example, a first rule that identifies and removes isolated users and a second rule that identifies and removes users caught in a loop.

In the first rule, the rules module 402 detects that a user does not have a valid value in the manager attribute of its user profile. The following table illustrates an example where the managerID 425 of person ID 123 and 325 is not valid because managerID 425 does not exist in the user profile data:

| PersonID | Name | ManagerID |
|---|---|---|
| 123 | Faisal | 425 |
| 325 | Binyan | 425 |
| 633 | Scott | 526 |

In the above example, personID 123, 325, 633 do not have any child nodes.

In another example, the rules module 402 detects that a user does not have a value in the manager attribute of its user profile. The following table illustrates an example where the managerID of personID 123 is blank or null:

| PersonID | Name | ManagerID |
|---|---|---|
| 123 | Faisal | null |
| 325 | Binyan | 633 |
| 633 | Scott | 526 |

In the above example, personID 123, 325, 633 do not have any child nodes.

In the second rule, the rules module 402 detects that a manager at a higher level in a hierarchy reports to another user in one or more levels below the manager, thereby creating a loop. The following table illustrates an example where the managerID 234 reports to a user (personID 425) that also reports to the managerID 234:

| PersonID | Name | ManagerID |
|---|---|---|
| 123 | Faisal | 425 |
| 234 | Binyan | 425 |
| 345 | Anji | 425 |
| 425 | Scott | 234 |

The following table illustrates an example where the personID 123 reports to the same personID 123:

| PersonID | Name | ManagerID |
|---|---|---|
| 123 | Faisal | 123 |
| 325 | Binyan | 425 |
| 633 | Scott | 526 |

In another example, the rules module 402 forms two groups: a first group for users who have a manager after running the operations (from the first and second rules) above, and a second group for users who do not have a manager after running the operations above.

For the second group, the rules module 402 identifies and assigns a manager for a user in the second group. For example, user John Doe of enterprise 224 does not have a manager assigned in the user profile data. The rules module 402 performs the following algorithm based on collaboration data to identify and assign a manager to John Doe.

The rules module 402 calculates a table of all users with whom John has recurring 1:1 meetings (hours and/or count). One example a definition of a recurring 1:1 meeting definition is the total meeting hours where the meeting is recurring=and the total number of attendees is 2 and the participant included John Doe. For a predefined time period (X months), the rules module 402 determines the following from the collaboration data:

| S. No | Employee | Total recurring 1:1 hours |
|---|---|---|
| 1 | Mark | 40 |
| 2 | Jennifer | 20 |
| 3 | James | 10 |

If the rules module 402 finds no candidate managers, the rules module 402 performs another calculation based on the following 1:1 meeting definition=total meeting hours where total attendees=2 and participant=John Doe. For a predefined time period (X months). In those X months, the rules module 402 determines the following from the collaboration data:

| S. No | Employee | Total 1:1 hours |
|---|---|---|
| 1 | Mark | 40 |
| 2 | Jennifer | 20 |
| 3 | James | 10 |

The rules module 402 selects the first 3 users and check if they are managers in the user profile data from the directory application 124. If they are not, the rules module 402 eliminates them. If they are, the rules module 402 continues to the next step.

For example, the user profile data indicates that Mark is not a manager, but Jennifer and James are. In this example, the rules module 402 eliminates Mark, finds Jennifer and Mark's team (individuals). The rules module 402 then calculates John's total collaboration time with Jennifer and James' team (for X months):

| S. No | Team | Total collaboration hours |
|---|---|---|
| 1 | Jennifer's team | 80 |
| 2 | James's team | 190 |

The rules module 402 determines that John belongs to James' team because total collaboration hours with James's team exceed the total collaboration hours with Jennifer's team by a margin (e.g., 138%) that exceeds a preset threshold margin (e.g., 50%). In one example embodiment, the rules module 402 modifies the manager attribute and adds the value of the manager attribute with the newly identified manager (e.g., James).

Once the rules module 402 has completed this computation for all of the users from the second group, the rules module 402 may perform the same computation for all of the users from the first group to validate the corresponding value in the manager attribute of the users in the first group. In one example embodiment, the rules module 402 modifies the manager attribute and replaces the value of the manager attribute with the newly identified manager (e.g., James).

The following tables illustrate other examples of rules for manager heuristics from the rules module 402:

| | | |
|---|---|---|
| 3. Measure 'remaining' employees | Calculate the proportion of employees remaining relative to the total company size (referred to as value A %). | Consider a 10,000-person company. If 100 employees are removed in Rule 1 and 2,400 employees are removed in Rule 2 then: A = 25% |

| | | | PersonID | Name | ManagerID |
|---|---|---|---|---|---|
| 4. Identify fragmented trees | Case where a root node has at least 2 children and 1 or more layers of hierarchy, but the root node has: No manager ID A manager ID that does not appear | | 123 | Faisal | 425 |
| | | | 234 | Binyan | 425 |
| | | | 345 | Anji | 425 |
| | | | 425 | Scott | null |
| 4.1 Calculate the ratio of employees in largest tree to employees in all smaller trees | Count employees in the largest tree. Count employees in all 'small' trees (trees that are not the largest ones). Divide the first number by the second. Call this Output: R | | R = 6:4 = 1.5 | | |
| 4.2 Count the average number of employees per fragmented tree (divided by total number of employees) | Count total number of employees in 'small' trees (trees that are not the largest ones). Count total number of employees. Divide the first number by the second. Call this Output: F | | F = 2/10 = 0.2 | | |
| 4.3. Count layers in the tallest tree | Count number of layers in the tallest tree (of all fragmented trees). Call this Output: L | | L = 3 | | |
| 5. Measure number of managers per X employees at each layer (on tallest & largest trees) | For each layer in the hierarchy calculate the number of managers (L1, L2, ..., Ln) per N employees. Output: a set '$S_M$' of proportions. | | [Assume 3-layered hierarchy and N = 100] L1: For a group of 100 employees, measure 25 L1 managers. L2: For a group of 100 employees, measure 5 L2 managers. L3: For a group of 100 employees, measure 3 L3 managers. 'SM' = [25, 5, 3] | | |
| 6. Measure number of direct reports per X managers at each layer (on tallest & largest trees) | For each layer in the hierarchy calculate the number of employees (L1, L2, ..., Ln) per N managers. Output: a set '$S_R$' of proportions. | | [Assume 3-layered hierarchy and N = 10] L1: For a group of 10 L1 managers, measure 250 employees. L2: For a group of 10 L2 managers, measure 50 employees. L3: For a group of 10 L3 managers, measure 30 employees. 'SR' = [250, 50, 30] | | |

| | -continued | |
|---|---|---|
| 7. Compute decision | Use A, R, F, L, and SM as inputs to the decision function $fM$<br>If $fM$ (A, R, F, L, SM, SR) = True:<br>Display results metrics of a collaboration analysis (e.g., Manager insights)<br>If $fM$ (A, R, F, L, SM, SR) = False:<br>Hide results metrics of a collaboration analysis (e.g., Manager insights) | |

The following table illustrates a set of rules are for organization heuristics:

| Rule # | Description | Example | | |
|---|---|---|---|---|
| | | PersonID | Name | Org |
| 1. Remove Nulls | Case where a PersonID has no Organization attribute | 123<br>325 | Faisal<br>Binyan | null<br>B |
| | | Org | Org Size (% of total emp's) | Outside $\tilde{x} - 2\sigma$? |
| 2. Remove 'small' Orgs | Case where an Org's size/total company size falls $2\sigma$ outside of $\tilde{x}$ (on the left-hand side of the distribution). | L<br>M<br>N | B<br>C<br>D | Yes<br>No<br>No |
| | | Org | Org Size (% of total emp's) | Outside $\tilde{x} + 2\sigma$? |
| 3. Remove 'large' Orgs | Case where an Org's size/total company size falls $2\sigma$ outside of $\tilde{x}$ (on the right-hand side of the distribution) | L<br>M<br>N | B<br>C<br>D | Yes<br>No<br>No |
| 4. Measure total number of Orgs | After applying heuristic rules 1-3: Calculate total number of Orgs/Total Company Size (call this value D) | Consider a 1000-person company. If 90 Orgs are removed as a result of Steps 1-3 then: D = 9% | | |
| 5. Measure remaining Employees | Calculate the proportion of employees remaining relative to the total company size. (call this value E %). | Consider a 10,000-person company. If 1,000 employees are removed as a result of Steps 1-3 then: E = 90% | | |
| 6. Compute Decision | Use D & E as inputs to the decision function $fO$<br>If $fO$ (D, E) = true:<br>Display results on organization analytics (e.g., Organization insights)<br>If $fO$ (D, E) = false:<br>Do not display results on organization analytics (e.g., Organization insights) | | | |

The following example illustrates hypothetical baselines for each metric/rule for an evaluation of manager and organization data:

| Metric # | Metric Description | Threshold |
|---|---|---|
| 1 | % employees remaining after Rules 1 and 2 | [65%, 90%] |
| 2 | % employees in tallest tree | [1.5, 12] |
| 3 | # of fragmented trees/total employees | [0.01%, 0.15%] |
| 4 | Layers in tallest tree | [3, 6] |
| 5 | Number of (Ln) managers per 1000 employees | L1: [20, 30] L2: [2.5, 7.3] L3: [1, 4] |
| 6 | Number of direct employees per 50 (Ln) managers (tallest tree) | L1: [230, 270] L2: [30, 72.5] L3: [25, 31] |
| 7 & 8 | Organization size bounds/ total employees | $\bar{x} = 0.07$ $s = 0.03$ [0.01, 0.13] |
| 9 | % Orgs remaining after Rules 1-3 | [64%, 90%] |
| 10 | % Emp's remaining Rules 1-3 | [72%, 95%] |

The following table illustrates an example case where all results of an analysis based on the user profile data are displayed:

| Case 1: | The system determines that the quality of the user profile data is good. | | | | | |
|---|---|---|---|---|---|---|
| Function $fM$ (parameters): | A | R | F | L | SM | SR |
| $fM$ inputs for this company: | 87% | 10 | 0.05% | 4 | L1: 18 L2: 3 L3: 2.8 | L1: 231 L2: 36 L3: 29 |
| $fM$ (output): | TRUE | | | | | |
| Function $fO$ (parameters): | D | | | E | | |
| $fO$ inputs for this company: | 70% | | | 80% | | |
| $fO$ (output): | TRUE | | | | | |
| Conclusion: | The outputs for the two decision functions are true. Both manager and organization experiences are enabled. | | | | | |

| Behavior: | Enabled/Disabled |
|---|---|
| Focus time analytics (e.g., scheduled time spent without distractions) | Enabled |
| Decision Making Meetings analytics (e.g., time in meeting resulting in a decision) | Enabled |
| Cross group collaboration analytics (e.g., time spent collaborating with users/colleagues from other groups) | Enabled |
| Manager connectedness analytics (e.g., time spent collaborating with a manager/supervisor) | Enabled |

The following table illustrates an example where an analysis based on the user profile data are disabled:

| Case 2: | The system determines that the quality of the user profile data is poor. | | | | | |
|---|---|---|---|---|---|---|
| Function $fM$ (parameters): | A | R | F | L | SM | SR |
| $fM$ inputs for this company: | 73% | 17 | 0.2% | 3 | L1: 20 L2: 2 L3: 1 | L1: 400 L2: 80 L3: 30 |
| $fM$ (output): | FALSE | | | | | |
| Function $fO$ (parameters): | D | | | E | | |
| $fO$ inputs for this company: | 54% | | | 61% | | |
| $fO$ (output): | FALSE | | | | | |

-continued

| Conclusion: | The outputs for the two decision functions are false. Both manager and organization experiences are disabled. | |
|---|---|---|
| | Behavior: | Enabled/Disabled |
| | Focus | Disabled |
| | Decision Making Meetings | Disabled |
| | Cross group collaboration | Disabled |
| | Manager connectedness | Disabled |
| | Influencers | Disabled |
| | Wellbeing (Work-life Balance) | Disabled |
| | Manager coaching | Disabled |

The following table illustrates an example where some results metrics of an analysis based on the user profile data are displayed:

| Case 3: | The system determines that the quality of the user profile data is mixed (good and poor). | | | | | |
|---|---|---|---|---|---|---|
| Function $fM$ (parameters): | A | R | F | L | SM | SR |
| $fM$ inputs for this company: | 70% | 14 | 0.025% | 6 | L1: 10 L2: 2 L3: 1 | L1: 201 L2: 15 L3: 12 |
| $fM$ (output): | | | FALSE | | | |
| Function $fO$ (parameters): | D | | | | E | |
| $fO$ inputs for this company: | 85% | | | | 95% | |
| $fO$ (output): | | | TRUE | | | |
| Conclusion: | The outputs for the two decision functions are false for $fM$ and true for $fO$. As such, only the insights for Organization are enabled for this customer. | | | | | |

| Behavior: | Enabled/Disabled |
|---|---|
| Focus | Enabled |
| Decision Making Meetings | Enabled |
| Cross group collaboration | Enabled |
| Manager connectedness | Disabled |
| Influencers | Disabled |
| Wellbeing (Work-life Balance) | Enabled |
| Manager coaching | Disabled |

Figure 5:
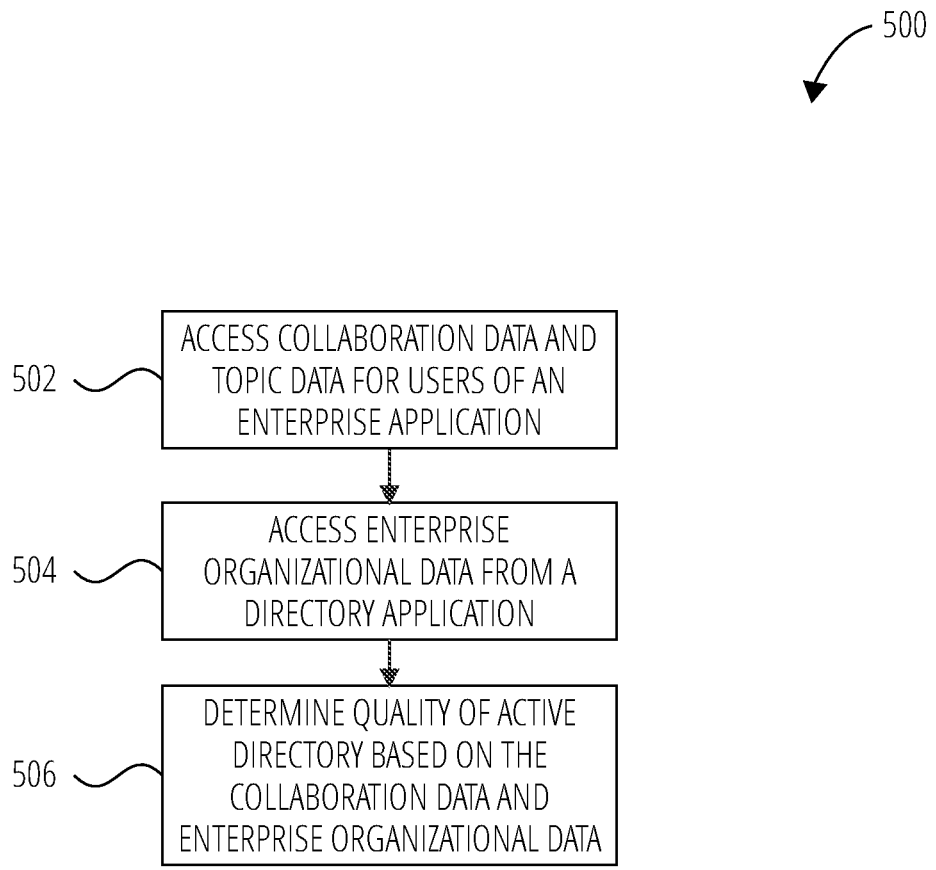
FIG. 5 is a flow diagram illustrating a method for determining a quality of an active directory in accordance with one example embodiment.

FIG. 5 is a flow diagram illustrating a method for determining a quality of an active directory in accordance with one example embodiment. Operations in the method 500 may be performed by the heuristics validation engine 126, using components (e.g., modules, engines) described above with respect to FIG. 3. Accordingly, the method 500 is described by way of example with reference to the heuristics validation engine 126. However, it shall be appreciated that at least some of the operations of the method 500 may be deployed on various other hardware configurations or be performed by similar components residing elsewhere. For example, some of the operations may be performed at the enterprise application 122.

At block 502, the heuristics module 304 accesses collaboration data and topic data for user of an enterprise application from the enterprise application interface 302. At block 504, the heuristics module 304 accesses enterprise organization data from a directory application from the directory application interface 310. At block 506, the quality assessment module 306 determines a quality of the active directory based on the collaboration data and the enterprise organizational data.

Figure 6:
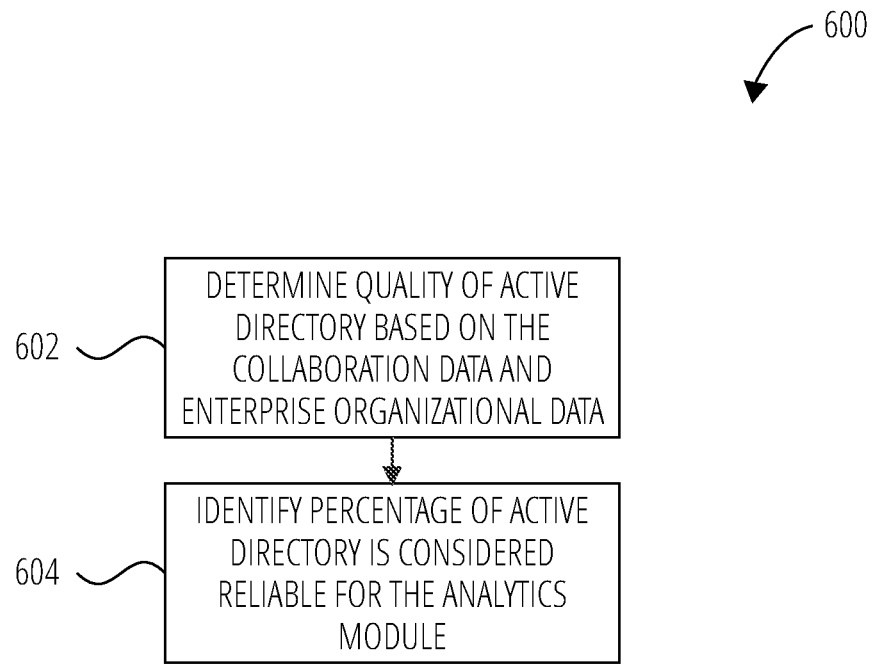
FIG. 6 is a flow diagram illustrating a method for quantifying a quality of an active directory in accordance with one example embodiment.

FIG. 6 is a flow diagram illustrating a method for quantifying a quality of an active directory in accordance with one example embodiment. Operations in the method 600 may be performed by the heuristics validation engine 126, using components (e.g., modules, engines) described above with respect to FIG. 3. Accordingly, the method 600 is described by way of example with reference to the heuristics validation engine 126. However, it shall be appreciated that at least some of the operations of the method 600 may be deployed on various other hardware configurations or be performed by similar components residing elsewhere. For example, some of the operations may be performed at the enterprise application 122.

At block 602, the heuristics module 304 determines a quality of user profile data from the directory application 124 based on the collaboration data and the enterprise organizational data. At block 604, the quality assessment module 306 identifies a percentage of active directory considered to be reliable for the analytics module 308.

Figure 7:
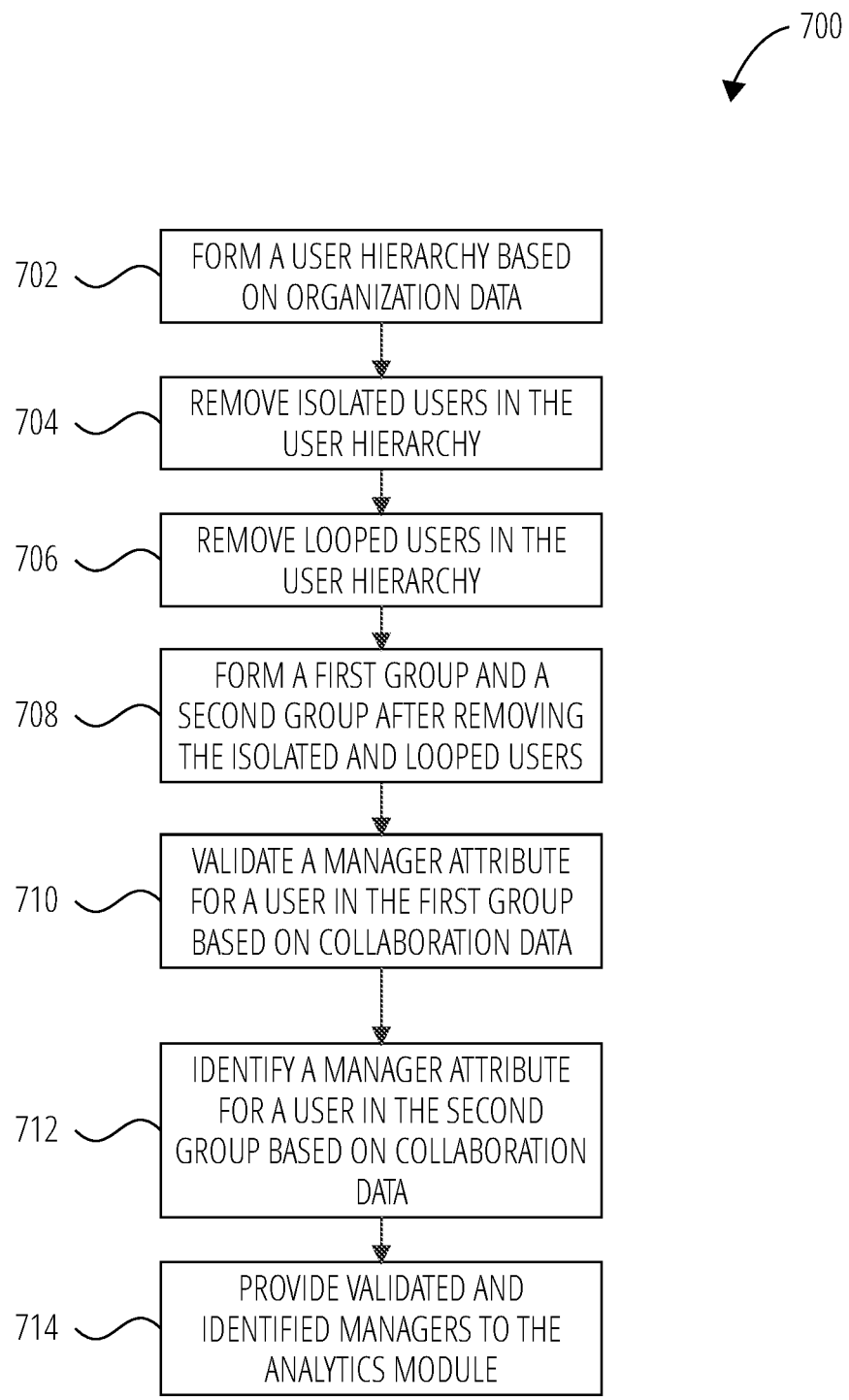
FIG. 7 is a flow diagram illustrating a method for providing validated users in accordance with one example embodiment.

FIG. 7 is a flow diagram illustrating a method for providing validated users in accordance with one example embodiment. Operations in the method 700 may be performed by the heuristics validation engine 126, using components (e.g., modules, engines) described above with respect to FIG. 3. Accordingly, the method 700 is described by way of example with reference to the heuristics validation engine 126. However, it shall be appreciated that at least some of the operations of the method 700 may be deployed on various other hardware configurations or be performed by similar components residing elsewhere. For example, some of the operations may be performed at the enterprise application 122.

At block 702, the heuristics module 304 forms a user hierarchy based on organization data. At block 704, the rules module 402 removes isolated users in the user hierarchy. At block 706, the rules module 402 removes looped users in the user hierarchy. At block 708, the rules module 402 forms a first group and a second group after removing the isolated and looped users. At block 710, the rules module 402 validates a value for a manager attribute for a user in the first group based on collaboration data. At block 712, the rules module 402 identifies a value for a manager attribute for a user in the second group based on collaboration data. At block 714, the rules module 402 provides validated and identified managers to the analytics module 308.

Figure 8:
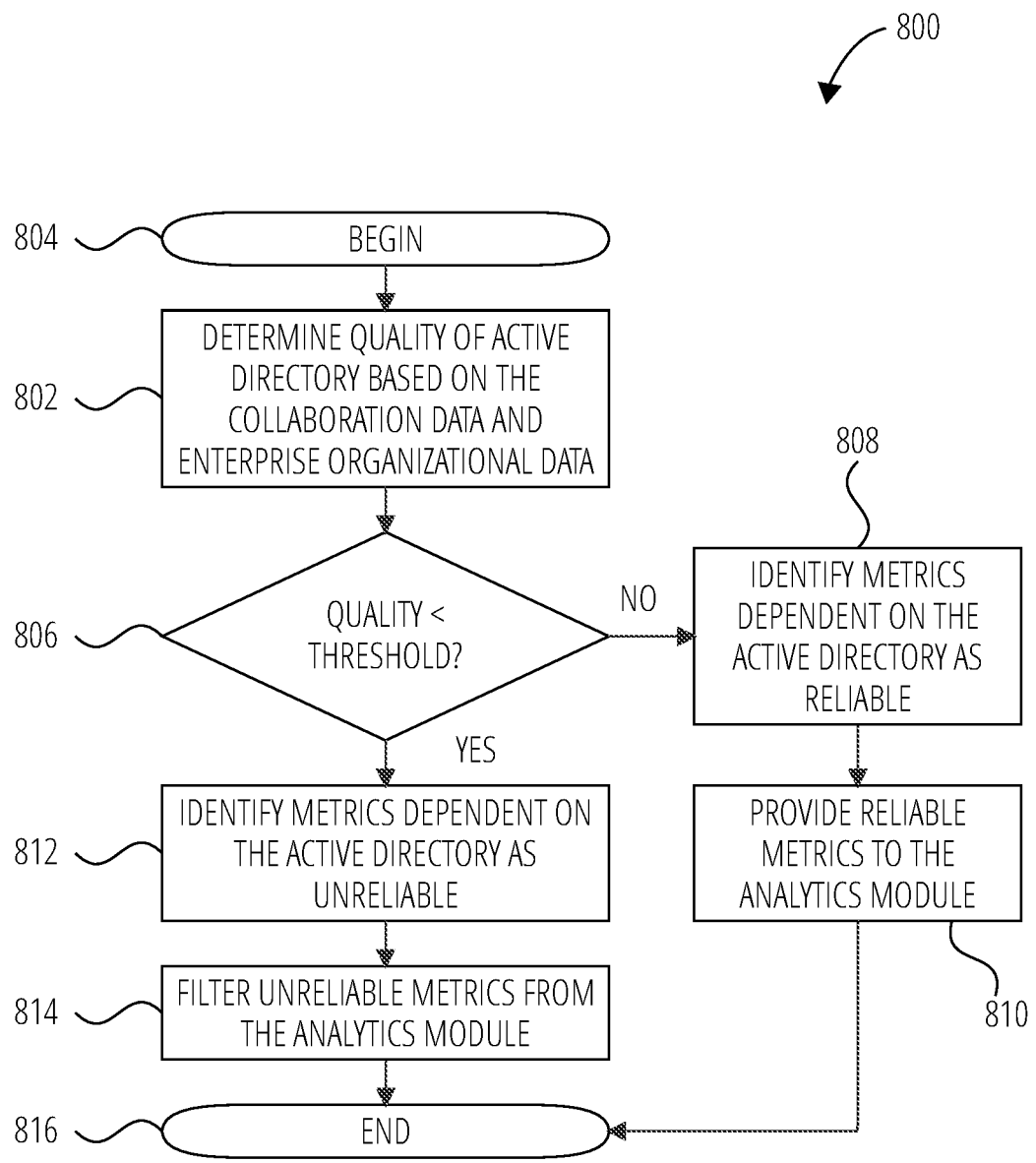
FIG. 8 is a flow diagram illustrating a method for determining a quality of an active directory in accordance with one example embodiment.

FIG. 8 is a flow diagram illustrating a method for determining a quality of an active directory in accordance with one example embodiment. Operations in the method 800 may be performed by the heuristics validation engine 126, using components (e.g., modules, engines) described above with respect to FIG. 3. Accordingly, the method 800 is described by way of example with reference to the heuristics validation engine 126. However, it shall be appreciated that at least some of the operations of the method 800 may be deployed on various other hardware configurations or be performed by similar components residing elsewhere. For example, some of the operations may be performed at the enterprise application 122.

The method 800 starts at done block 804. At block 802, the quality assessment module 306 determines a quality of the active directory based on the collaboration data and the enterprise organizational data. At decision block 806, the quality assessment module 306 determines whether the quality level is below a preset threshold. If the quality level is higher than the preset threshold, the quality assessment module 306 identifies metrics dependent on the active directory as reliable in block 808. At block 810, the quality assessment module 306 provides the reliable metrics to the analytics module 308. If the quality level is lower than the preset threshold, the quality assessment module 306 identifies metrics that depend on the active directory as unreliable at block 812. At block 814, the quality assessment module 306 filters unreliable metrics from the analytics module 308. The method 800 ends at done block 816.

Figure 9:
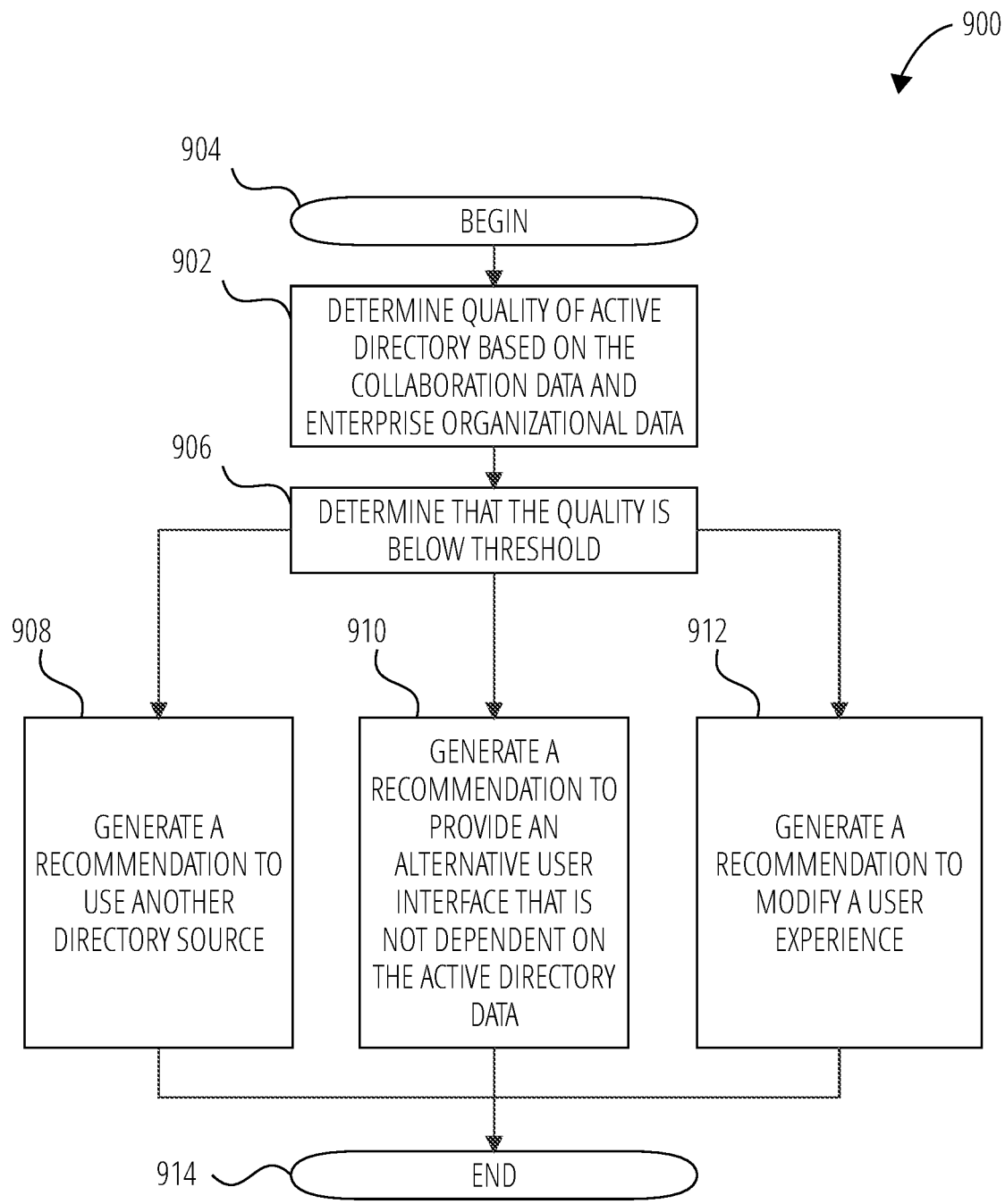
FIG. 9 is a flow diagram illustrating a method for generating a recommendation in accordance with one example embodiment.
Figure 10:
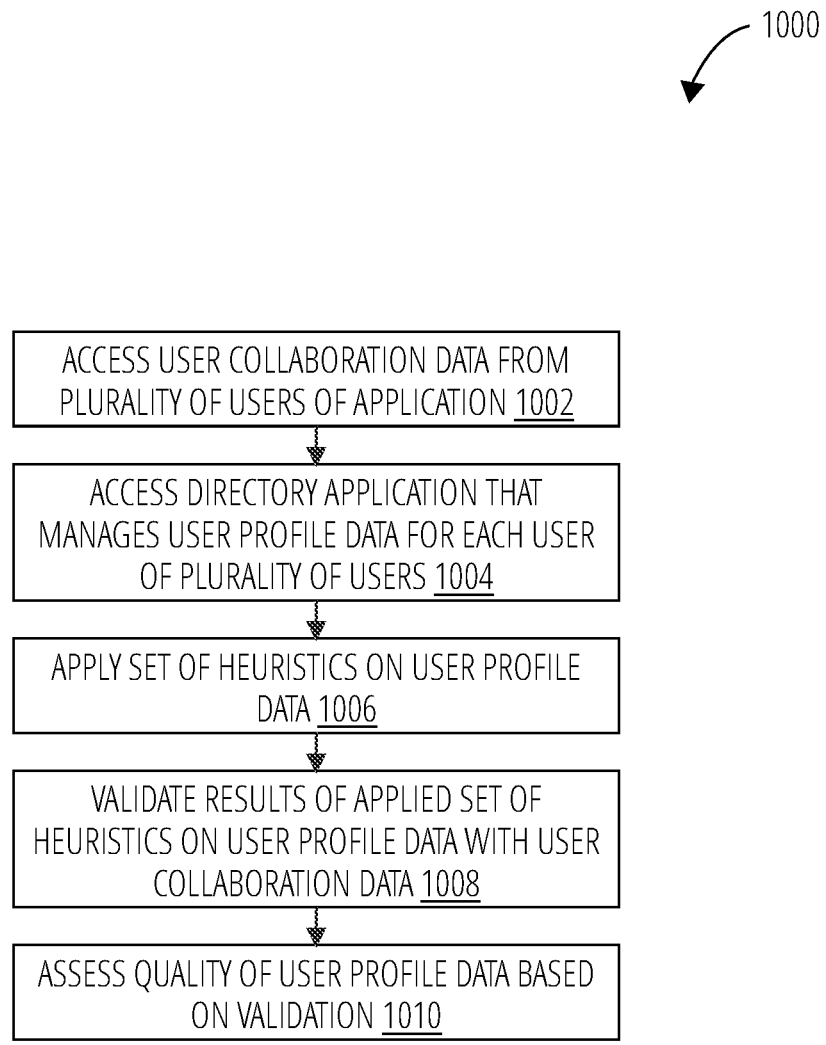
FIG. 10 illustrates a routine 1000 in accordance with one embodiment.

FIG. 9 is a flow diagram illustrating a method for generating a recommendation in accordance with one example embodiment. Operations in the method 900 may be performed by the heuristics validation engine 126, using components (e.g., modules, engines) described above with respect to FIG. 3. Accordingly, the method 900 is described by way of example with reference to the heuristics validation engine 126. However, it shall be appreciated that at least some of the operations of the method 900 may be deployed on various other hardware configurations or be performed by similar components residing elsewhere. For example, some of the operations may be performed at the enterprise application 122.

The method 900 starts at done block 904. At block 902, the quality assessment module 306 determines a quality of an active directory (e.g., user profile data) based on collaboration data and enterprise organizational data. At block 906, the quality assessment module 306 determines that the quality of the active directory is below a threshold. The quality assessment module 306 generates one or more recommendation from block 908, block 910, or block 912. At block 908, the quality assessment module 306 generates a recommendation to use another directory source (e.g., another user profile data). At block 910, the quality assessment module 306 generates a recommendation to provide an alternative user interface that is not dependent on the active directory data. At block 912, the quality assessment module 306 generates a recommendation to modify or alter a user experience workflow that would have depended on unreliable user profile data (e.g., manager attribute).

In block 1002, routine 1000 accesses user collaboration data from a plurality of users of an application. In block 1004, routine 1000 accesses a directory application that manages user profile data for each user of the plurality of users. In block 1006, routine 1000 applies a set of heuristics on the user profile data. In block 1008, routine 1000 validates the results of the applied set of heuristics on the user profile data with the user collaboration data. In block 1010, routine 1000 assesses a quality of the user profile data based on the validation.

Figure 11:
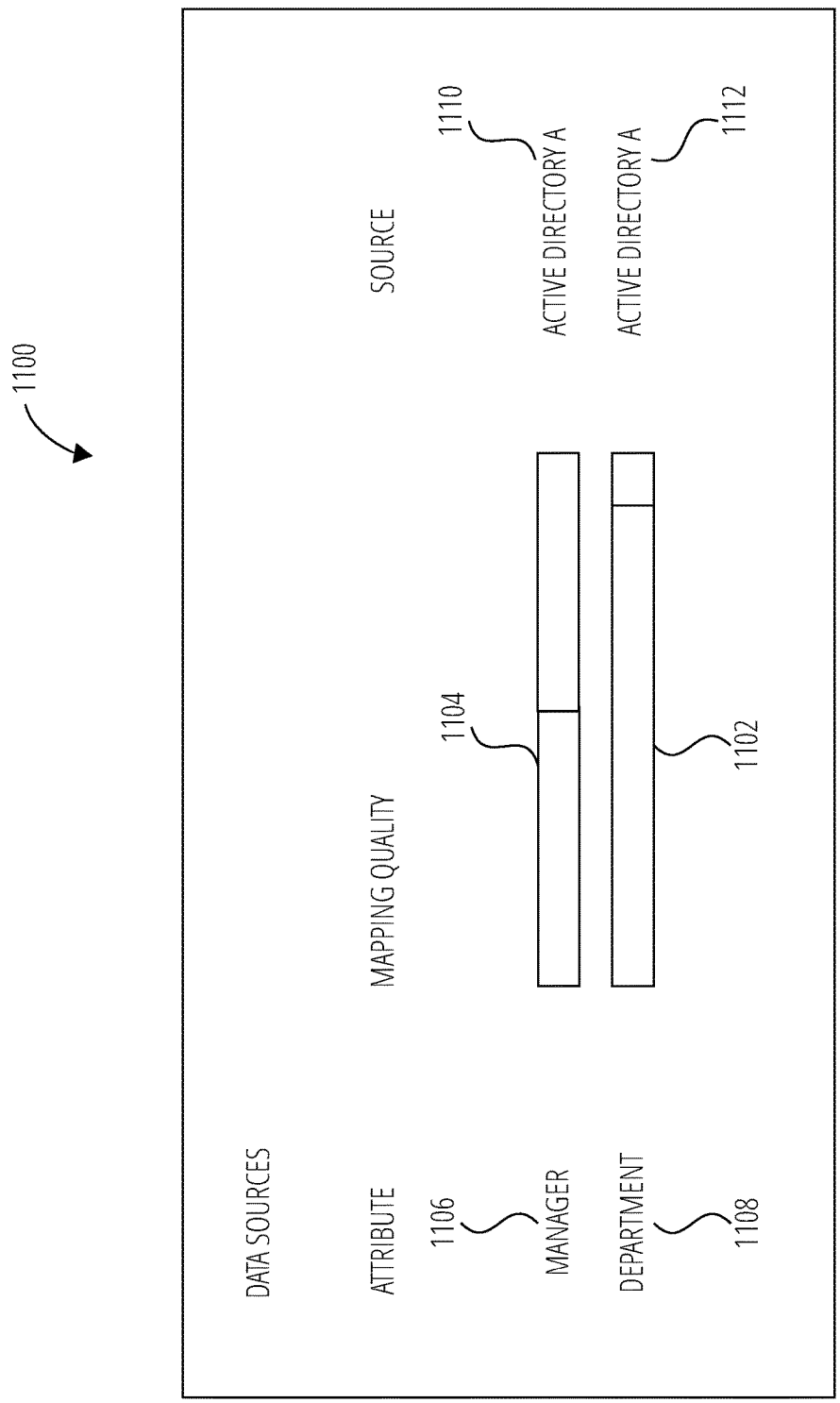
FIG. 11 illustrates a graphical user interface 1100 in accordance with one example embodiment.

FIG. 11 illustrates a graphical user interface 1100 in accordance with one example embodiment. The graphical user interface 1100 indicates a mapping quality graph mapping quality bar 1104 that indicates a quality of a manager 1106 of user profile data from active directory A 1110. The graphical user interface 1100 indicates a mapping quality bar 1102 that indicates a quality of a department attribute 1108 of user profile data from active directory A 1112.

Figure 12:
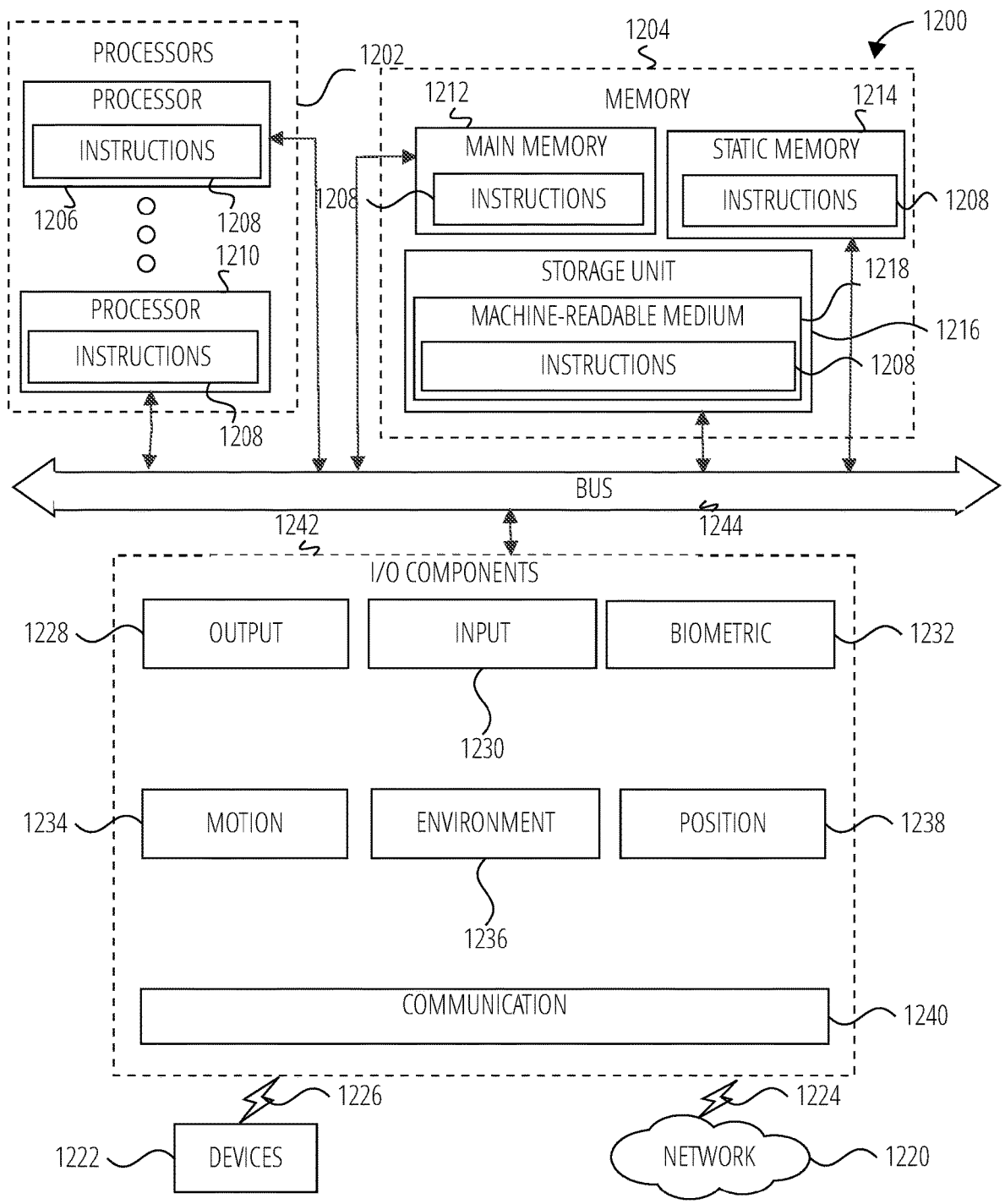
FIG. 12 is a diagrammatic representation of a machine in the form of a computer system within which a set of instructions may be executed for causing the machine to perform any one or more of the methodologies discussed herein, according to an example embodiment.

FIG. 12 is a diagrammatic representation of the machine 1200 within which instructions 1208 (e.g., software, a program, an application, an applet, an app, or other executable code) for causing the machine 1200 to perform any one or more of the methodologies discussed herein may be executed. For example, the instructions 1208 may cause the machine 1200 to execute any one or more of the methods described herein. The instructions 1208 transform the general, non-programmed machine 1200 into a particular machine 1200 programmed to carry out the described and illustrated functions in the manner described. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1208, sequentially or otherwise, that specify actions to be taken by the machine 1200. Further, while only a single machine 1200 is illustrated, the term "machine" shall also be taken to include a collection of machines that individually or jointly execute the instructions 1208 to perform any one or more of the methodologies discussed herein.

The machine 1200 may include processors 1202, memory 1204, and I/O components 1242, which may be configured to communicate with each other via a bus 1244. In an example embodiment, the processors 1202 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1206 and a processor 1210 that execute the instructions 1208. The term "processor" is intended to include multi-core processors that may comprise two or more independent processors (sometimes referred to as "cores") that may execute instructions contemporaneously. Although FIG. 12 shows multiple processors 1202, the machine 1200 may include a single processor with a single core, a single processor with multiple cores (e.g., a multi-core processor), multiple processors with a single core, multiple processors with multiples cores, or any combination thereof.

The memory 1204 includes a main memory 1212, a static memory 1214, and a storage unit 1216, both accessible to the processors 1202 via the bus 1244. The main memory 1204, the static memory 1214, and storage unit 1216 store the instructions 1208 embodying any one or more of the methodologies or functions described herein. The instructions 1208 may also reside, completely or partially, within the main memory 1212, within the static memory 1214, within machine-readable medium 1218 within the storage unit 1216, within at least one of the processors 1202 (e.g., within the processor's cache memory), or any suitable combination thereof, during execution thereof by the machine 1200.

The I/O components 1242 may include a wide variety of components to receive input, provide output, produce output, transmit information, exchange information, capture measurements, and so on. The specific I/O components 1242 that are included in a particular machine will depend on the type of machine. For example, portable machines such as mobile phones may include a touch input device or other such input mechanisms, while a headless server machine will likely not include such a touch input device. It will be appreciated that the I/O components 1242 may include many other components that are not shown in FIG. 12. In various example embodiments, the I/O components 1242 may include output components 1228 and input components 1230. The output components 1228 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1230 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1242 may include biometric components 1232, motion components 1234, environmental components 1236, or position components 1238, among a wide array of other components. For example, the biometric components 1232 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1234 include acceleration sensor components (e.g., accelerometer), gravitation sensor components, rotation sensor components (e.g., gyroscope), and so forth. The environmental components 1236 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1238 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1242 further include communication components 1240 operable to couple the machine 1200 to a network 1220 or devices 1222 via a coupling 1224 and a coupling 1226, respectively. For example, the communication components 1240 may include a network interface component or another suitable device to interface with the network 1220. In further examples, the communication components 1240 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1222 may be another machine or any of a wide variety of peripheral devices (e.g., a peripheral device coupled via a USB).

Moreover, the communication components 1240 may detect identifiers or include components operable to detect identifiers. For example, the communication components 1240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1240, such as location via Internet Protocol (IP) geolocation, location via Wi-Fi® signal triangulation, location via detecting an NFC beacon signal that may indicate a particular location, and so forth.

The various memories (e.g., memory 1204, main memory 1212, static memory 1214, and/or memory of the processors 1202) and/or storage unit 1216 may store one or more sets of instructions and data structures (e.g., software) embodying or used by any one or more of the methodologies or functions described herein. These instructions (e.g., the instructions 1208), when executed by processors 1202, cause various operations to implement the disclosed embodiments.

The instructions 1208 may be transmitted or received over the network 1220, using a transmission medium, via a network interface device (e.g., a network interface component included in the communication components 1240) and using any one of a number of well-known transfer protocols (e.g., hypertext transfer protocol (HTTP)). Similarly, the instructions 1208 may be transmitted or received using a transmission medium via the coupling 1226 (e.g., a peer-to-peer coupling) to the devices 1222.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

EXAMPLES

Example 1 is a computer-implemented method comprising: accessing user collaboration data of a plurality of users of an application; accessing a directory application that manages user profile data for each user of the plurality of users; applying a set of heuristics on the user profile data; validating results of the applied set of heuristics on the user profile data with the user collaboration data; and assessing a quality of the user profile data based on the validation.

Example 2 includes Example 1, further comprising: forming a tree comprising leaf nodes and parent nodes based on the user profile data of the plurality of users, the tree indicating a manager hierarchy, a leaf node representing a user, and a parent node representing a manager of the user; applying a set of rules from the set of heuristics to the tree; updating the tree based on the set of rules; and assessing a quality of the updated tree based on a number of missing manager attributes from the user profile data of the updated tree.

Example 3 includes any of the above examples, wherein the set of rules comprise: identifying and removing isolated users from the user profile data; and identifying and removing users caught in a loop from the user profile data.

Example 4 includes any of the above examples, further comprising: forming a first group for users that have a value in a corresponding manager attribute of their user profile data based on the updated tree; and forming a second group for users that are without a value in the corresponding manager attribute of their user profile data based on the updated tree.

Example 5 includes any of the above examples, further comprising: identifying a manager for a user in the first group based on the user collaboration data; and updating a manager attribute of the user profile data of the user in the first group with the identified manager for the user in the first group.

Example 6 includes any of the above examples, further comprising: identifying a manager for a user in the second group based on the user collaboration data; and assigning the identified manager to the manager attribute of the user in the second group in the user profile data from the directory application.

Example 7 includes any of the above examples, wherein identifying the manager further comprises: identifying a plurality of candidate users with whom the user in the second group has a recurring one-on-one meeting based on the user collaboration data; computing a total duration value for each of the plurality of candidate users within a preset period; and identifying a candidate user with a highest total duration value from the plurality of candidate users; verifying that the identified candidate user is a manager based on the user profile data; and in response to the verifying, assigning the identified candidate user as the manager for the user in the second group.

Example 8 includes any of the above examples, wherein assessing the quality of the user profile data further comprises: modifying the user profile data based on a set of rules from the set of heuristics applied to the user profile data; identifying manager attribute values for each user from the user collaboration data; and validating manager attribute entries for each user in the modified user profile data with the manager attribute values for each user from the user collaboration data.

Example 9 includes any of the above examples, further comprising: determining that the quality of the user profile data is below a preset threshold; and in response to determining that the quality of the user profile data is below the preset threshold, generating a recommendation, the recommendation indicating at least one of a recommendation to use another directory source, to provide an alternate user interface that present metrics that do not depend on a manager attribute from the user profile data for each user of the plurality of users, or to modify a user experience workflow.

Example 10 includes any of the above examples, wherein the set of heuristics further comprises a manager heuristic and an organization heuristic, the manager heuristic comprising a first set of rules that validates a mapping of a manager attribute with the user from the user profile data, the organization heuristic comprising a second set of rules that validates a mapping of an organization attribute with the user from the user profile data, wherein the user collaboration data comprises metrics that measure a time and frequency of interactions between a first user of the plurality of users and a second user of the plurality of users.

What is claimed is:

1. A computer-implemented method comprising:
accessing user collaboration data of a plurality of users of an application;
accessing a directory application that manages user profile data for each user of the plurality of users;
applying a set of heuristics on the user profile data;
validating results of the applied set of heuristics on the user profile data with the user collaboration data;
assessing a quality of the user profile data based on the validation;
forming a tree comprising leaf nodes and parent nodes based on the user profile data of the plurality of users, the tree indicating a manager hierarchy, a leaf node representing a user, and a parent node representing a manager of the user;
applying a set of rules from the set of heuristics to the tree;
updating the tree based on the set of rules; and
assessing a quality of the updated tree based on a number of missing manager attributes from the user profile data of the updated tree.

2. The computer-implemented method of claim 1, wherein the set of rules comprise: identifying and removing isolated users from the user profile data; and identifying and removing users caught in a loop from the user profile data.

3. The computer-implemented method of claim 1, further comprising:
forming a first group for users that have a value in a corresponding manager attribute of their user profile data based on the updated tree; and
forming a second group for users that are without a value in the corresponding manager attribute of their user profile data based on the updated tree.

4. The computer-implemented method of claim 3, further comprising:
identifying a manager for a user in the first group based on the user collaboration data; and
updating a manager attribute of the user profile data of the user in the first group with the identified manager for the user in the first group.

5. The computer-implemented method of claim 3, further comprising:
identifying a manager for a user in the second group based on the user collaboration data; and
assigning the identified manager to the manager attribute of the user in the second group in the user profile data from the directory application.

6. The computer-implemented method of claim 5, wherein identifying the manager further comprises:
identifying a plurality of candidate users with whom the user in the second group has a recurring one-on-one meeting based on the user collaboration data;
computing a total duration value for each of the plurality of candidate users within a preset period; and
identifying a candidate user with a highest total duration value from the plurality of candidate users;
verifying that the identified candidate user is a manager based on the user profile data; and
in response to the verifying, assigning the identified candidate user as the manager for the user in the second group.

7. The computer-implemented method of claim 1, wherein assessing the quality of the user profile data further comprises:
modifying the user profile data based on a set of rules from the set of heuristics applied to the user profile data;
identifying manager attribute values for each user frorri the user collaboration data; and
validating manager attribute entries for each user in the modified user profile data with the manager attribute values for each user from the user collaboration data.

8. The computer-implemented method of claim 1, further comprising:
determining that the quality of the user profile data is below a preset threshold; and
in response to determining that the quality of the user profile data is below the preset threshold, generating a recommendation, the recommendation indicating at least one of a recommendation to use another directory source, to provide an alternate user interface that present metrics that do not depend on a manager attribute from the user profile data for each user of the plurality of users, or to modify a user experience workflow.

9. The computer-implemented method of claim 1, wherein the set of heuristics further comprises a manager heuristic and an organization heuristic, the manager heuristic comprising a first set of rules that validates a mapping of a manager attribute with the user from the user profile data, the organization heuristic comprising a second set of rules that validates a mapping of an organization attribute with the user from the user profile data, wherein the user collaboration data comprises metrics that measure a time and frequency of interactions between a first user of the plurality of users and a second user of the plurality of users.

10. A computing apparatus, the computing apparatus comprising:
a processor; and
a memory storing instructions that, when executed by the processor, configure the apparatus to:
access user collaboration data of a plurality of users of an application;
access a directory application that manages user profile data for each user of the plurality of users;
apply a set of heuristics on the user profile data;
validate results of the applied set of heuristics on the user profile data with the user collaboration data;
assess a quality of the user profile data based on the validation;
form a tree comprising leaf nodes and parent nodes based on the user profile data of the plurality of users, the tree indicating a manager hierarchy, a leaf node representing a user, and a parent node representing a manager of the user;
apply a set of rules from the set of heuristics to the tree;
update the tree based on the set of rules; and
assess a quality of the updated tree based on a number of missing manager attributes from the user profile data of the updated tree.

11. The computing apparatus of claim 10, wherein the set of rules comprise: identify and removing isolated users from the user profile data; and identifying and removing users caught in a loop from the user profile data.

12. The computing apparatus of claim 10, wherein the instructions further configure the apparatus to:
form a first group for users that have a value in a corresponding manager attribute of their user profile data based on the updated tree; and
form a second group for users that are without a value in the corresponding manager attribute of their user profile data based on the updated tree.

13. The computing apparatus of claim 12, wherein the instructions further configure the apparatus to:

identify a manager for a user in the first group based on the user collaboration data; and update a manager attribute of the user profile data of the user in the first group with the identified manager for the user in the first group.

14. The computing apparatus of claim 12, wherein the instructions further configure the apparatus to:

identify a manager for a user in the second group based on the user collaboration data; and assign the identified manager to the manager attribute of the user in the second group in the user profile data from the directory application.

15. The computing apparatus of claim 14, wherein identifying the manager further comprises:

identify a plurality of candidate users with whom the user in the second group has a recurring one-on-one meeting based on the user collaboration data;

compute a total duration value for each of the plurality of candidate users within a preset period; and identify a candidate user with a highest total duration-value from the plurality of candidate users;

verify that the identified candidate user is a manager based on the user profile data; and in response to the verifying, assign the identified candidate user as the manager for the user in the second group.

16. The computing apparatus of claim 10, wherein assessing the quality of the user profile data further comprises:

modify the user profile data based on a set of rules from the set of heuristics applied to the user profile data;

identify manager attribute values for each user from the user collaboration data; and validate manager attribute entries for each user in the modified user profile data with the manager attribute values for each user from the user collaboration data.

17. The computing apparatus of claim 10, wherein the instructions further configure the apparatus to:

determine that the quality of the user profile data is below a preset threshold; and in response to determining that the quality of the user profile data is below the preset threshold, generate a recommendation, the recommendation indicating at least one of a recommendation to use another directory source, to provide an alternate user interface that present metrics that do not depend on a manager attribute from the user profile data for each user of the plurality of users, or to modify a user experience workflow.

18. A non-transitory computer-readable storage medium, the non-transitory computer-readable storage medium including instructions that when executed by a computer, cause the computer to:

access user collaboration data of a plurality of users of an application;

access a directory application that manages user profile data for each user of the plurality of users;

apply a set of heuristics on the user profile data;

validate results of the applied set of heuristics on the user profile data with the user collaboration data;

assess a quality of the user profile data based on the validation:

form a tree comprising leaf nodes and parent nodes based on the user profile data of the plurality of users, the tree indicating a manager hierarchy, a leaf node representing a user, and a parent node representing a manager of the user;

apply a set of rules from the set of heuristics to the tree;

update the tree based on the set of rules; and assess a quality of the updated tree based on a number of missing manager attributes from the user profile data of the updated tree.

* * * * *